April 21, 1931.  C. H. DANIELS  1,801,803
BOOT OR SHOE AND METHOD OF MAKING SAME
Filed Dec. 12, 1930
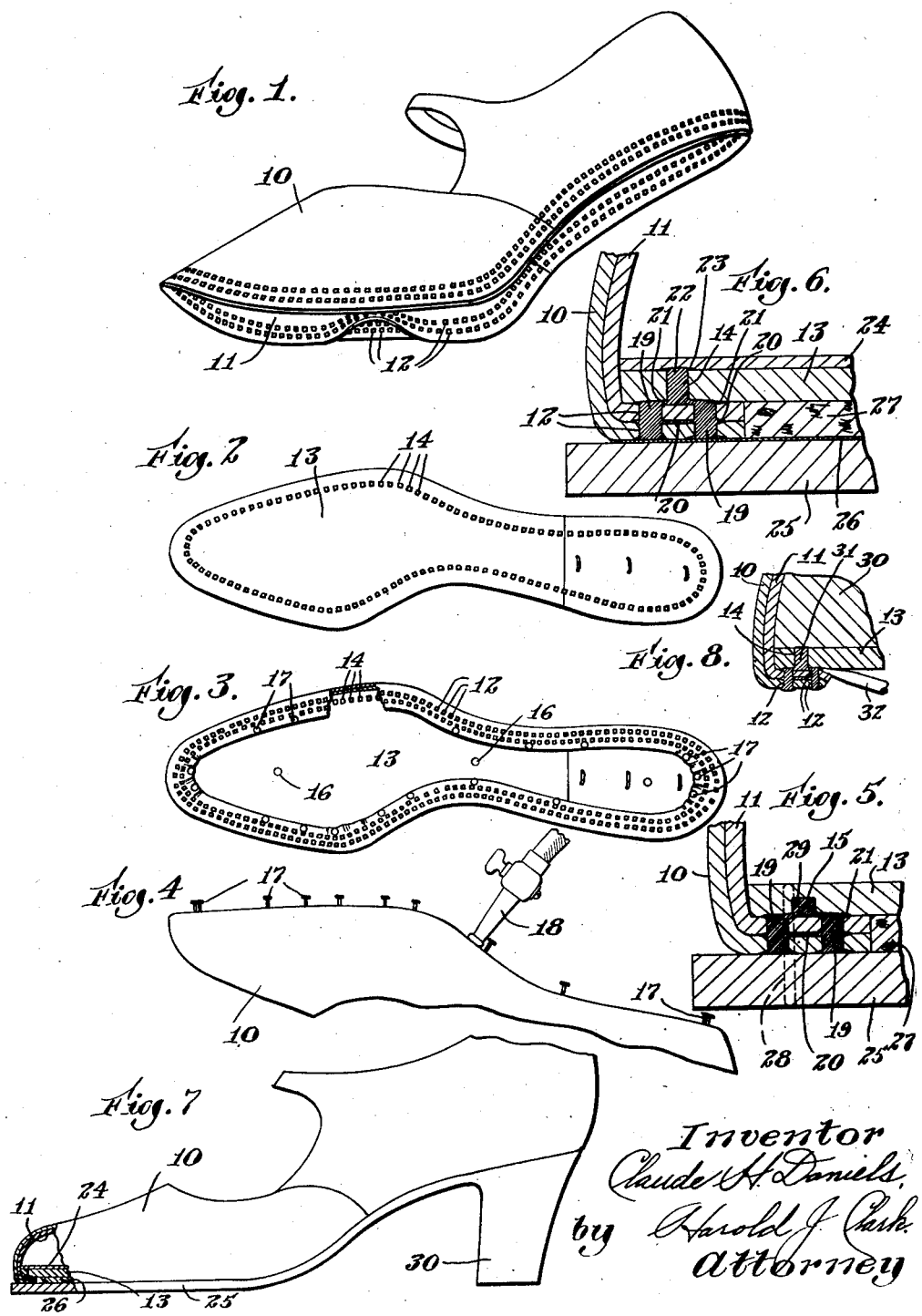

Patented Apr. 21, 1931

1,801,803

UNITED STATES PATENT OFFICE

CLAUDE H. DANIELS, OF NEWTON CENTER, MASSACHUSETTS

BOOT OR SHOE AND METHOD OF MAKING SAME

Application filed December 12, 1930. Serial No. 501,831.

My present invention relates to boots and shoes, and includes novel steps in the method of manufacture thereof.

An important object of the present invention is the provision of a boot or shoe wherein the upper materials are permanently secured to the insole by cement or other suitable adhesive.

Another and important object of the invention resides in the provision of means both in the upper material and insole whereby the cement or other adhesive utilized as the uniting medium will constitute a continuous body, through and between the layers of upper materials and between said materials and into or through the insole.

Another object of the invention resides in the novel steps of manufacture which comprise perforating the lower marginal edge of the united upper materials with a plurality of apertures or perforations through all the layers of said upper materials, providing the insole to which said upper materials are to be adhered with means to receive cement or other adhesive, temporarily securing the lasted upper materials to the insole with the cement receiving means in the insole located beneath the perforated marginal edge of the upper materials, and then applying cement or other adhesive under pressure to the outside marginal edge of the upper materials whereby said cement or other adhesive will be forced through the said perforations, spreading between the layers of the upper materials, and spreading between the upper materials and the insole, and into or through the means provided in the insole to receive said adhesive, thus providing a continuous body of adhesive from the insole through all the layers of the upper materials, and firmly, securely, and permanently adhering or uniting the upper materials to said insole.

Heretofore, when securing the upper materials to the insole by adhesive, it has been customary to coat the bottom marginal edge of the insole with adhesive, then coat the under marginal edge of the upper materials, and also to apply a coating of cement between the layers of the upper materials. This prior method has resulted in a shoe wherein a separating non-contacting or non-connected layer of adhesive was provided between adjacent layers of upper materials and insole. My present invention not only eliminates the separate cementing steps heretofore required, but results in a shoe of far greater strength and wherein the upper materials are secured to the insole with a much firmer anchorage than has heretofore been possible.

The means in the insole to receive the cement may comprise a series of indented recesses around the bottom marginal edge of said insole or may comprise a series of perforations completely through the insole around its marginal edge, either of these constructions proving satisfactorily in carrying out my novel process and in my novel shoe.

After the upper materials are thus united to the insole, the outsole may be applied in any desirable manner, either by stitching, or by cement or other suitable adhesive. In the latter instance, the performed body of cement provided in uniting the upper materials to the insole will aid and assist in further securing the outsole to the insole by providing an improved anchorage or holding therefor.

The benefits, advantages, savings, and improvements of my novel shoe and method, above briefly described, will be readily apparent to those skilled in the art, and since I believe that both said shoe and said process are novel, I have claimed the same broadly in this application.

Other objects and features of the invention, details of construction, and combinations of parts, will be hereinafter more fully pointed out, described and claimed.

Referring to the drawings, illustrating a preferred embodiment of the present invention, Fig. 1 is a perspective view of an assembled upper, perforated in accordance with my invention;

Fig. 2 is a bottom plan view of an insole prepared for cooperation with said upper materials;

Fig. 3 is a bottom plan view illustrating the lasted upper materials temporarily held to the insole;

Fig. 4 is a fragmentary side elevation illustrating a conventional method of applying the cement under pressure;

Fig. 5 is an enlarged fragmentary cross sectional view of the completed shoe with indented recesses in the insole and with the outsole attached by stitching;

Fig. 6 is an enlarged fragmentary cross sectional view illustrating the insole as provided with cement receiving perforations therethrough and with the outsole fixed to the shoe by cement;

Fig. 7 is a fragmentary side elevation, partly broken away, of a completed shoe constructed according to my invention; and Fig. 8 is a fragmentary cross sectional detail illustrating the application of cement under pressure between the upper materials and insole.

Referring now to the drawings, for a particular description of the invention, 10 designates a shoe upper with which has been assembled the lining 11. This assembled upper is then provided with a plurality of perforations 12 which are simultaneously formed through the upper 10 and lining 11, so that the perforations in said two layers are preferably in register. In the event that the upper constitutes more than two layers, the perforations would be formed through all layers in the same manner. As will be noted, from a glance at Fig. 2 and Fig. 3, the perforations 12 extend completely around the upper materials. The insole 13 is also provided with a plurality of perforations 14 extending around the marginal edge thereof, although, if desired, in place of the perforations 14, I may provide the insole 13 with indented recesses 15, as clearly illustrated in Fig. 5. The insole 13, thus prepared, is applied to a suitable last, and held thereon by temporary tacks 16. Thereupon the assembled upper is wiped over the insole 13, and the edges of said upper are temporarily held in place by lasting tacks 17. When the upper has been wiped over the insole 13, the perforated marginal edge of said upper will be over said insole, with the perforations 12 in substantial alinement with the perforations 14 or recesses 15, as the case may be, in the insole 13.

With the shoe thus far formed, that is, with the upper materials pulled over the insole and temporarily held thereon by the tacks 17, cement or other suitable adhesive is applied under pressure to the perforated edge of the upper materials. This may be performed by feeding cement under pressure from any suitable source and through any suitable device, such as the nozzle 18, which is preferably placed firmly against the perforated margin of the upper materials.

The application of the cement or other adhesive under pressure will cause the cement to flow through the perforations 12 in the upper 10 and lining 11, as illustrated at 19 in Fig. 6; and the cement, thus forced through said perforations 12 under pressure, will spread between the upper 10 and lining 11 as illustrated at 20, and will also spread between the lining 11 and insole 13, as illustrated at 21, and thus through the perforations 14 in the insole 13, as shown at 22, and will also spread outwardly or flow on to the inner surface of the insole 13 as illustrated at 23. It will thus be apparent, from a glance at Fig. 6, that there is a continuous body of cement designated by the numerals 23, 22, 21, 19 and 20, firmly and securely uniting or anchoring the upper 10, lining 11, and insole 13. The flowing of the cement over the inner surface of the insole 13, adjacent to the perforations 14, as illustrated at 23, will cause no discomfort to the wearer of the shoe, because of the presence of the usual sock lining 24.

It will thus be apparent that the entire cementing of the upper 10, lining 11 and insole 13 is accomplished simply by the one operation of wiping the insole 18 around the perforated marginal edge of the upper materials, the pressure under which the cement is fed through the nozzle 18 forcing said cement to follow the channels and courses above described.

After the cementing operation above described has been completed, the tacks 16 and 17 are withdrawn, thus leaving no metallic uniting members or means between the upper materials and the insole.

Thereupon, an outsole 25 is applied, and this may be accomplished by cementing said outsole to the thus far completed shoe by a layer of cement or other adhesive 26, which is coated over the bottom marginal edge of the upper materials and over the bottom surface of the filler layer 27, or said outsole may be attached by through-and-through McKay stitching 28, if desired, as illustrated in Fig. 5. In Fig. 5, also, I have illustrated the indented recesses 15 in the inner sole 13, in place of the perforations 14. The cementing operation will be the same as illustrated in Fig. 6, with the exception that the portions 29 of the cement body will not extend completely through the insole 13; otherwise it will be identical, and will constitute a strong firm anchorage between the insole 13, upper 10 and lining 11.

Any desired means or method of lasting the upper materials on to the insole may be utilized.

Fig. 7 illustrates a completed shoe constructed according to the method illustrated in Fig. 6, the heel 30 to be of any desired type, size, shape, or style, and applied in any desired manner.

In Fig. 8 I have illustrated another method of applying the cement under pressure to the lasted upper materials and insole, this method having proved highly efficient in practice. As illustrated in Fig. 8, while the insole 13 is attached to the last 30 and after the upper materials 10 and lining 11 have been pulled over said insole and are temporarily held in position, cement 31 is forced under pressure from any suitable source, through a nozzle 32, the nozzle being applied between the lining 11 and insole, at the edge of the said lining, and moved around the edge of said lining, whereupon the cement 31 will be forced between the lining and insole, and will flow through the perforations 12 in the lining and thence between the surfaces of the upper materials and lining.

This method of application of cement under pressure is simple, and yet is highly efficient, causing an even flow of the cement at each side of the point of application, that is, into the perforations in the insole and also into the perforations in the upper materials.

It will thus be appreciated by those skilled in the art that I have devised a novel shoe, and a novel and simple, while yet highly efficient and positive method of constructing said shoe, and in carrying out my novel method, the time heretofore required for manufacturing shoes in which the upper materials are united to the insole by cementing will be materially reduced, and the cost of manufacture of said shoes considerably lessened.

While I have necessarily described my present invention somewhat in detail, it will be appreciated that I may vary the size, shape, and arrangement of parts, within reasonably wide limits, without departing from the spirit of the invention.

My invention is further described and defined in the form of claims as follows:

1. That improvement in the art of manufacturing boots and shoes which comprises the steps of folding the marginal portions of a boot or shoe upper section over an insole, securing the marginal portions of the upper section against the insole by temporary fastening means located at points to hold substantially all parts of the marginal portions of the upper section in their final position relative to the insole, applying an adhesive between the marginal portion of the upper section and the insole while the upper section is held by the temporary fastening means at the point where the adhesive is applied, and thereafter removing said temporary fastening means.

2. That improvement in the art of manufacturing boots and shoes which comprises the steps of providing the lining of a boot or shoe upper section with marginal perforations, folding the marginal portions of the upper section including the lining over an insole, securing the marginal portions of the upper section and lining against the insole by temporary fastening means, and then applying an adhesive between the marginal portion of the lining and the insole and into the perforations of the lining.

3. That improvement in the art of manufacturing boots and shoes which comprises the steps of providing the lining of a boot or shoe upper section with marginal perforations, folding the marginal portions of the upper section including the lining over an insole, securing the marginal portions of the upper section and lining against the insole by temporary fastening means, and then applying an adhesive between the superimposed portions of the lining and the upper section and into the perforations in the lining.

4. That improvement in the art of manufacturing boots and shoes which comprises the steps of folding the marginal portions of a boot or shoe upper section and lining over an insole, securing the marginal portions of the upper section and lining against the insole by temporary fastening means located at points to hold substantially all parts of the marginal portions of the upper section and lining in their final position relative to the insole, applying an adhesive between the marginal portion of the upper section and the insole and between the upper section and the lining while the upper section and lining are held by the temporary fastening means at the point where the adhesive is applied, and thereafter removing said temporary fastening means.

5. In a boot or shoe, an insole provided with a row of marginal openings, an upper member provided with two rows of marginal openings, the upper member being marginally folded over the marginal portion of the insole with the rows of openings in the upper member disposed, respectively, to either side of the row of openings in the insole, and a continuous body of adhesive filling the openings in the insole and the upper member and extending between the upper member and the insole.

6. In a boot or shoe, an insole provided with marginal openings, an upper member provided with marginal openings, the upper member being marginally folded over the marginal portion of the insole with the openings in the upper member disalined from the openings in the insole, and a continuous body of adhesive filling the openings in the insole and the upper member and extending between the upper member and the insole.

In testimony whereof, I have signed my name to this specification.

CLAUDE H. DANIELS.